(12) United States Patent
Kobayashi

(10) Patent No.: US 7,843,794 B2
(45) Date of Patent: Nov. 30, 2010

(54) OPTICAL PICKUP AND OPTICAL DISK APPARATUS

(75) Inventor: Takashi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 656 days.

(21) Appl. No.: 11/820,095

(22) Filed: Jun. 18, 2007

(65) Prior Publication Data

US 2008/0130471 A1   Jun. 5, 2008

(30) Foreign Application Priority Data

Jun. 22, 2006   (JP) .............................. 2006-172988

(51) Int. Cl.
G11B 7/135 (2006.01)
(52) U.S. Cl. .............................. 369/112.28; 369/44.23; 369/44.32; 359/837
(58) Field of Classification Search ............ 369/112.28, 369/44.23, 44.32; 359/837
See application file for complete search history.

(56) References Cited

U.S. PATENT DOCUMENTS

| | | | |
|---|---|---|---|
| 5,745,265 A * | 4/1998 | Hasegawa et al. ............. 359/15 |
| 6,181,666 B1 * | 1/2001 | Miyazaki et al. ....... 369/112.01 |
| 6,556,532 B2 * | 4/2003 | Ogawa et al. .......... 369/112.16 |
| 6,567,366 B2 * | 5/2003 | Kim et al. .............. 369/112.21 |
| 7,177,260 B2 * | 2/2007 | Kim et al. .............. 369/112.28 |
| 2001/0030861 A1* | 10/2001 | Oda et al. ...................... 362/31 |
| 2003/0185137 A1* | 10/2003 | Horinouchi et al. .... 369/112.22 |
| 2007/0165510 A1* | 7/2007 | Yamamoto ............. 369/112.28 |

FOREIGN PATENT DOCUMENTS

JP          2003-248960          9/2003

* cited by examiner

Primary Examiner—Wayne R Young
Assistant Examiner—Brenda Bernardi
(74) Attorney, Agent, or Firm—Wolf, Greenfield & Sacks, P.C.

(57) ABSTRACT

An optical pickup includes a light emitting device, a prism, and an objective lens. The light emitting device emits a laser beam. The prism has an entrance face and an exit face. In the prism, the laser beam emitted from the light emitting device is perpendicularly incident on the entrance face, is parallel-shifted, is perpendicularly reflected, and is emerged from the exit face. The objective lens focuses the laser beam emerged from the prism on a recording surface of an optical disk.

8 Claims, 9 Drawing Sheets

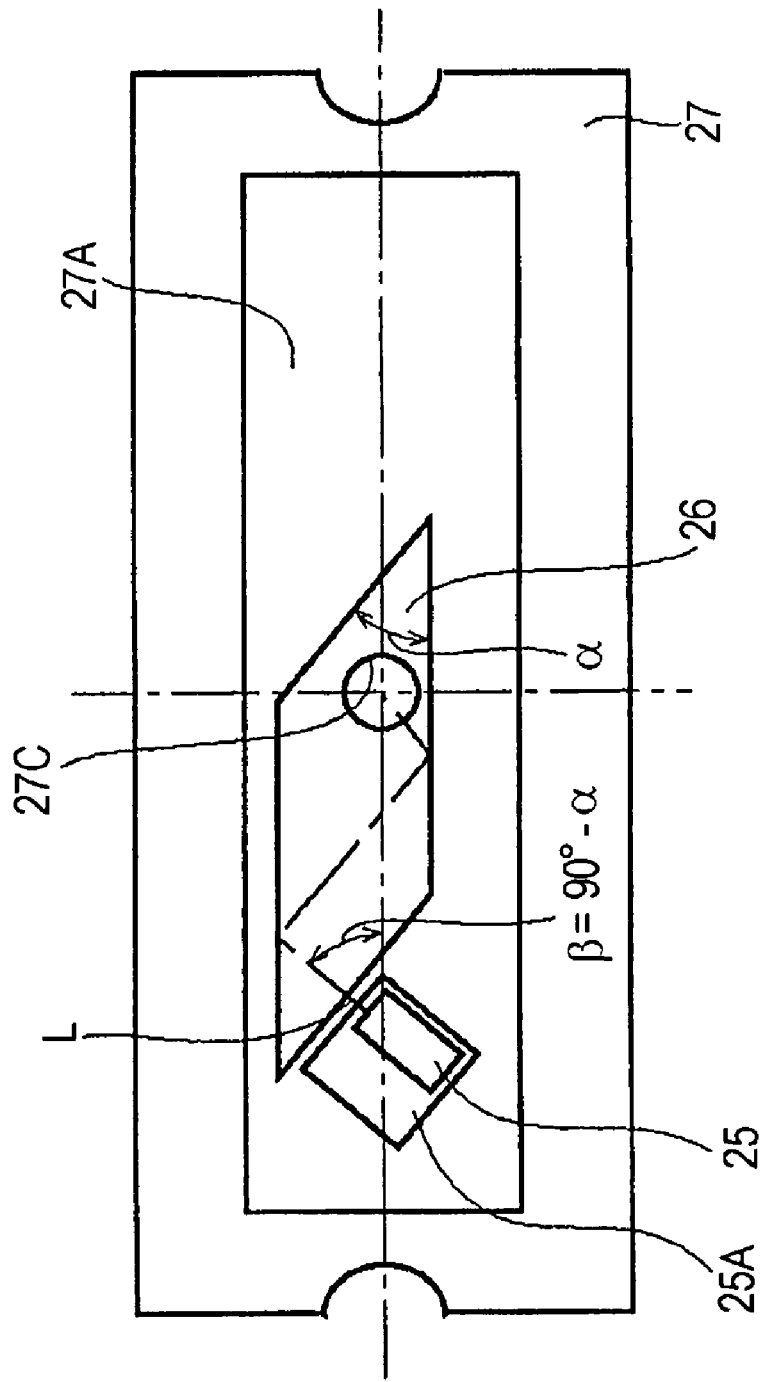

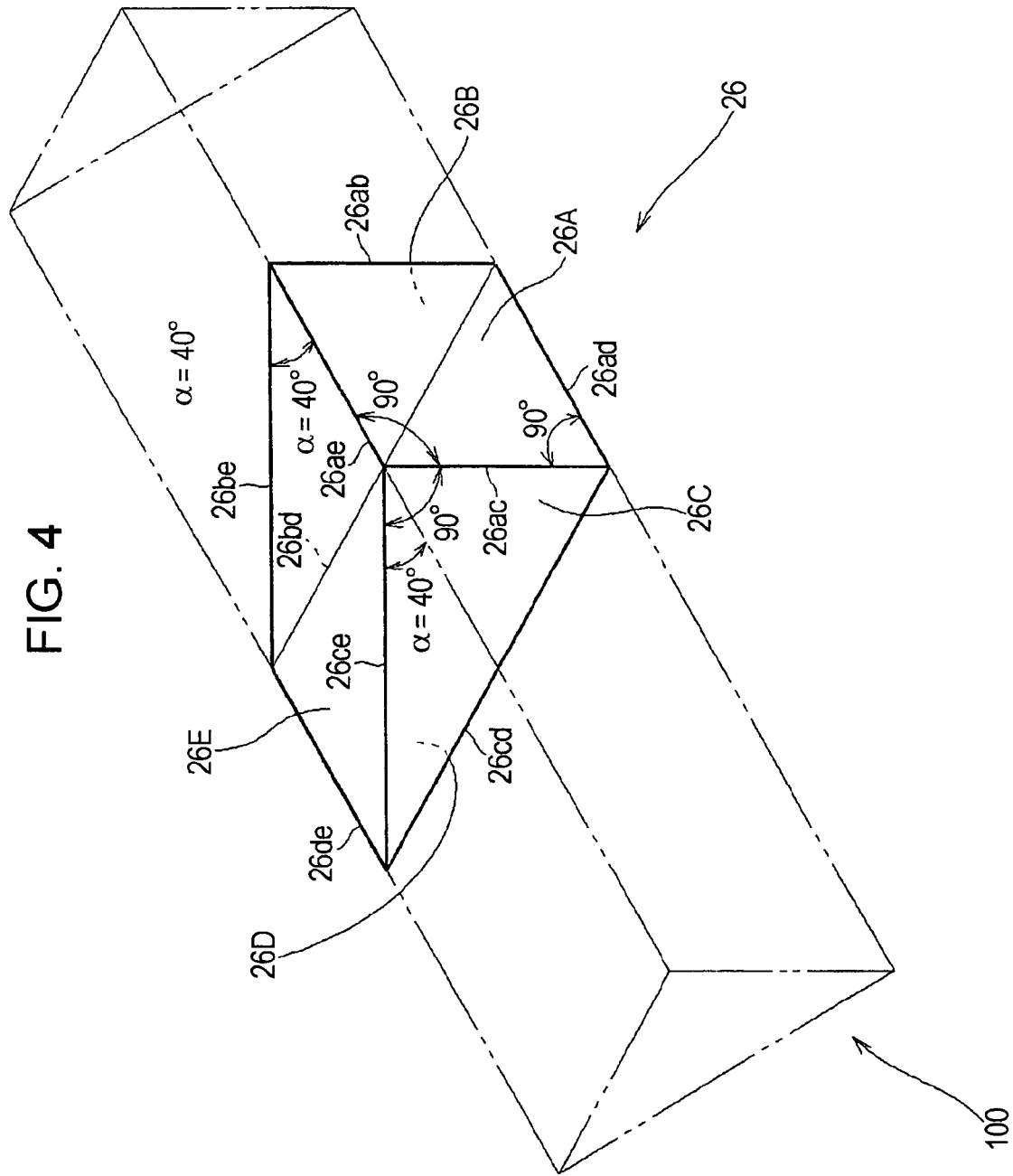

OPTICAL PICKUP AND OPTICAL DISK APPARATUS

CROSS REFERENCES TO RELATED APPLICATIONS

The present invention contains subject matter related to Japanese Patent Application JP 2006-172988 filed in the Japanese Patent Office on Jun. 22, 2006, the entire contents of which are incorporated herein by reference.

BACKGROUND OF THE INVENTION

1. Field of the Invention

The present invention relates to optical pickups for use in optical disk apparatuses.

2. Description of the Related Art

Laser diodes have been widely used as laser sources of optical pickups for used in optical disk apparatuses. The laser diodes have many advantages. For example, since the size of each laser diode is small and the power consumption thereof is low, the size of an optical pickup including the laser diode can be minimized.

A laser beam emitted from a laser diode has an elliptical cross-sectional shape (far-field pattern). Consequently, a spot formed by focusing the laser beam through an objective lens is also elliptical. In an optical pickup including such a laser diode, in order to optimize the shape of a laser beam spot to be formed on a track, the laser diode is mounted on the optical pickup such that the optical axis of the laser diode is rotated by a predetermined angle. Consequently, the track is irradiated with a laser beam rotated by the predetermined angle such that a beam spot with an optimum shape is formed on the track.

An integrated optical pickup is proposed as one of optical pickups for use in optical disk apparatuses. The integrated optical pickup includes, for example, a laser diode, a top emission prism, a package which is a molded part, made of ceramic, for sealing the laser diode and the prism, and an integrated optical assembly including a beam splitter, a diffraction grating, and a photodetector such that the integrated optical assembly is mounted on the package. Japanese Unexamined Patent Application Publication No. 2003-248960 discloses such an integrated optical pickup.

SUMMARY OF THE INVENTION

In recent years, miniaturization of laser diodes has been progressing. Further, various shaped laser diodes are widely diffused. In other words, in addition to a conventional cylindrical laser diode in a metal package, there are non-cylindrical laser diodes, such as a laser diode sealed in an elliptical columnar metal package and a chip type laser diode directly mounted on a chip.

However, those non-cylindrical laser diodes are difficult to mount such that the optical axis of the laser diode is rotated in order to optimize the shape of a beam spot formed on a track. Further, since the rotated non-cylindrical laser diode is mounted, the height of the laser diode is increased, thus preventing miniaturization of an optical pickup including the laser diode.

According to an approach to the optimization of a spot shape and the miniaturization of an optical pickup, the following arrangement as shown in FIG. 9 is proposed: An optical system composed of a laser diode 1 and a top emission prism 2 is mounted on a mounting surface 3A of a package 3 such that the optical system is deviated from the longitudinal axis of the package 3. Consequently, a laser beam, which is reflected by the top emission prism 2 and is emerged from the package 3, is rotated to optimize the shape of a beam spot formed on a track of an optical disk. In this arrangement, however, although it is unnecessary to rotate the optical axis of the laser diode 1, the width w of the package 3 is increased. Disadvantageously, the entire size of an optical pickup is increased.

According to an approach to preventing the increase in the width of the package 3, a relay mirror 4 can be used. The relay mirror 4 reflects a laser beam emitted from the laser diode 1 to the top emission prism 2 as shown in FIG. 10. Disadvantageously, the number of components constituting an optical pickup is increased. Unfortunately, an error in assembly of the optical pickup may be easily caused.

According to another approach, a roof prism is used as the top emission prism 2 as shown in FIG. 11. Since the top emission prism 2 has a reflecting function which is realized by the relay mirror 4 in FIG. 10, the number of components is not increased. Unfortunately, the roof prism has a complex structure, i.e., the arrangement of reflecting faces of the roof prism is complicated. Therefore, the roof prism is difficult to mass produce efficiently.

It is desirable to provide a small and simplified optical pickup capable of optimizing the shape of a beam spot formed on a track and an optical disk apparatus including the optical pickup.

According to an embodiment of the present invention, an optical pickup includes the following elements. A light emitting device emits a laser beam. A prism has an entrance face and an exit face. In the prism, the laser beam emitted from the light emitting device is perpendicularly incident on the entrance face, is parallel-shifted, is perpendicularly reflected, and is emerged from the exit face. An objective lens focuses the laser beam emerged from the prism on a recording surface of an optical disk.

In accordance with this embodiment, the single prism allows for parallel shift of a laser beam and upward deflection thereof. Advantageously, when the light emitting device is rotated in order to optimize the shape of a laser beam spot on a track, the width of the optical pickup can be minimized.

According to another embodiment of the present invention, an optical disk apparatus has an optical pickup including the following element. A light emitting device emits a laser beam. A prism has an entrance face and an exit face. In the prism, the laser beam emitted from the light emitting device is perpendicularly incident on the entrance face, is parallel-shifted, is perpendicularly reflected, and is emerged from the exit face. An objective lens focuses the laser beam emerged from the prism on a recording surface of an optical disk.

In accordance with this embodiment, the single prism allows for parallel shift of a laser beam and upward deflection thereof. Advantageously, when the light emitting device is rotated in order to optimize the shape of a laser beam spot on a track, the width of the optical pickup can be minimized.

According to each of the embodiments of the present invention, when the light emitting device is rotated in order to optimize the shape of a laser beam spot oh a track, the width of the optical pickup can be minimized, since the single prism allows for parallel shift of a laser beam and upward deflection thereof. Advantageously, a small and simplified optical pickup capable of optimizing the shape of a laser beam spot on a track and an optical disk apparatus including the optical pickup can be realized.

BRIEF DESCRIPTION OF THE DRAWINGS

FIG. 3 is a schematic diagram of an arrangement of a top emission prism and a laser diode in accordance with the embodiment;

FIG. 4 is a schematic perspective view of the top emission prism;

DESCRIPTION OF THE PREFERRED EMBODIMENTS

Embodiments of the present invention will now be described with reference to the accompanying drawings.

(1) Structure of Optical Disk Apparatus

Figure 1:
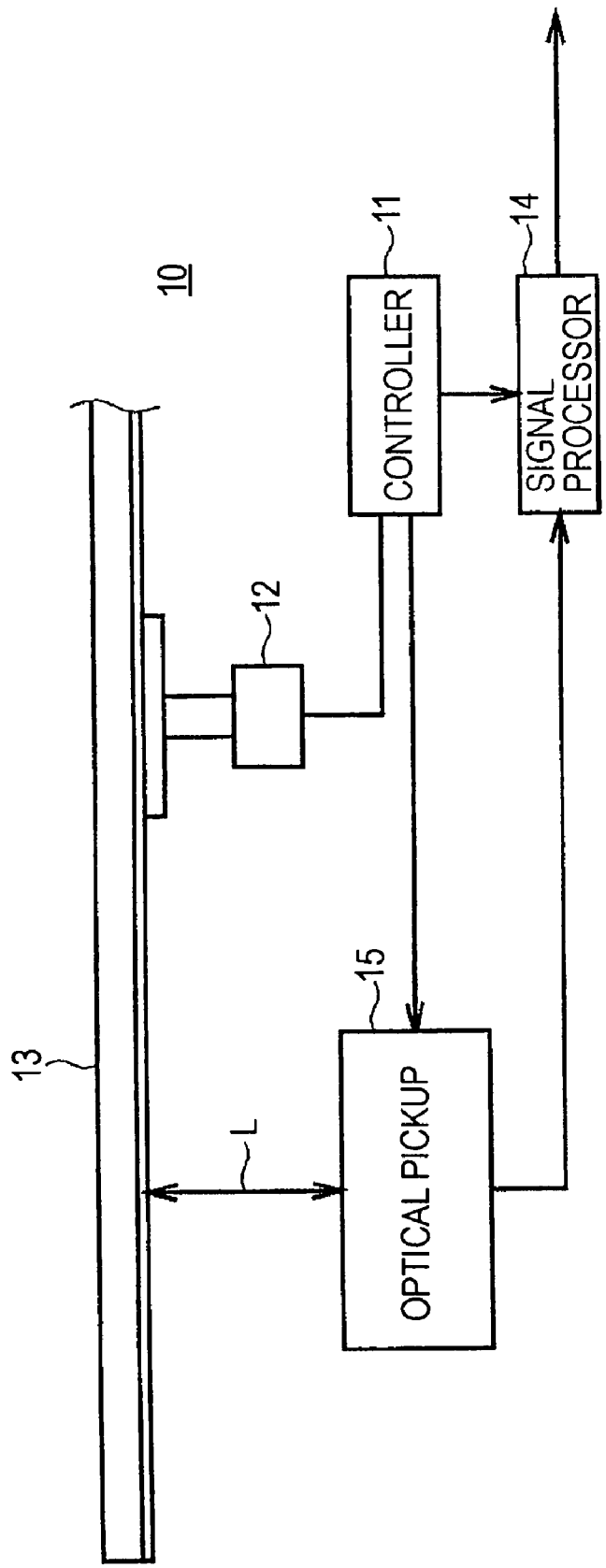
FIG. 1 is a block diagram of an optical disk apparatus according to an embodiment of the present invention.

FIG. 1 shows an optical disk apparatus 10 according to an embodiment of the present invention. A controller 11 controls the entire optical disk apparatus 10. The controller 11 controls a motor 12 to rotate an optical disk 13 and also controls an optical pickup 15 to irradiate the optical disk 13 with a laser beam. The optical pickup 15 detects a laser beam reflected by the optical disk 13, generates a reproduction signal, and supplies the signal to a signal processor 14. The signal processor 14 performs predetermined signal processing on the reproduction signal and outputs the resultant signal to the outside.

(2) Structure of Optical Pickup

Figure 2:
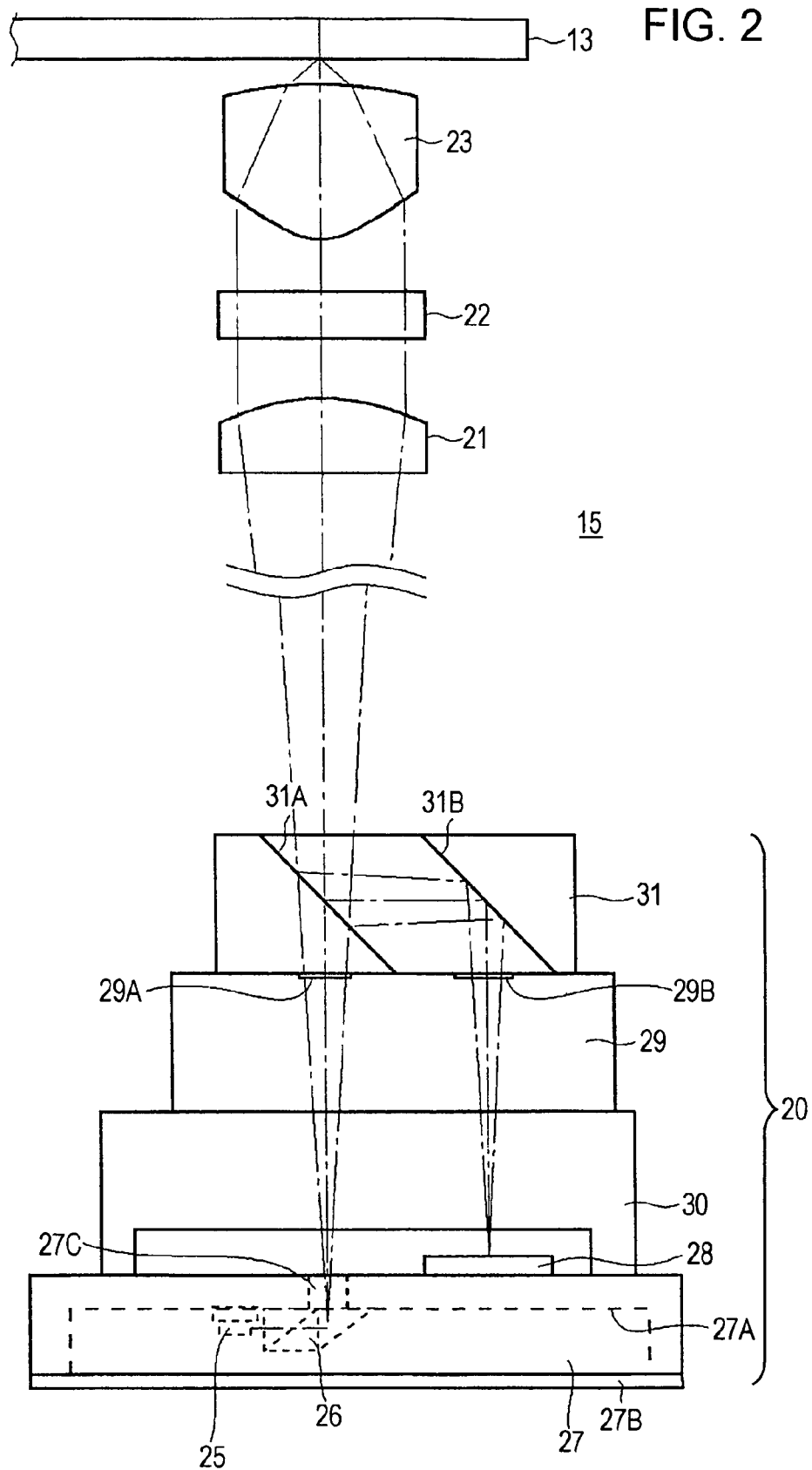
FIG. 2 is a schematic diagram of the structure of an optical pickup according to an embodiment of the present invention.

FIG. 2 shows the structure of the optical pickup 15 according to an embodiment of the present invention. The optical pickup 15 includes an optical assembly 20, a collimating lens 21, a quarter wave plate 22, and an objective lens 23. Those components are mounted on an optical pickup base (not shown), which will be referred to as an OP base hereinafter. The OP base is, for example, an aluminum die casting.

The optical assembly 20 includes a box-like open bottom package 27, serving as a holder, and various optical elements arranged on the package 27. A laser diode 25 and a top emission prism 26 are attached to a mounting face 27A, serving as the upper inner surface of the package 27. A lid 27B is attached to the open bottom of the package 27 such that the laser diode 25 and the top emission prism 26 are enclosed in the package 27.

A photodetector 28, a spacer 30, a mold compound element 29, and a prism assembly 31 are mounted in sequence on the upper outer surface of the package 27. The photodetector 28 receives a laser beam reflected by the optical disk 13 to obtain a reproduction signal and various servo error signals. The mold compound element 29 has a diffraction grating 29A and a hologram 29B. The prism assembly 31 includes a plurality of prisms.

In the optical assembly 20, a laser beam emitted from the laser diode 25 is deflected upward using the top emission prism 26 and is incident on a polarization beam splitter (PBS) 31A of the prism assembly 31 through an aperture 27C and the mold compound element 29.

The PBS 31A transmits the laser beam coming from the top emission prism 26 on the basis of the direction of polarization of the laser beam and allows the laser beam, serving as an output laser beam, to enter the collimating lens 21.

The collimating lens 21 transforms the output laser beam passing through the PBS 31A from diverging light into parallel light. Further, the quarter wave plate 22 transforms the leaser beam from linearly polarized light into circularly polarized light and allows the resultant beam to enter the objective lens 23. The objective lens 23 focuses the output laser beam on the optical disk 13 to irradiate a recording layer of the optical disk 13 with the laser beam.

In addition, the objective lens 23 collects a laser beam reflected from the optical disk 13 irradiated with the output laser beam. Further, the quarter wave plate 22 transforms the laser beam passing through the objective lens 23 into linearly polarized light whose polarization direction is different from that of the output laser beam by 90° and allows the resultant beam to enter the collimating lens 21. The collimating lens 21 transforms the laser beam from the parallel light into converging light and allows the resultant beam to enter the prism assembly 31.

The PBS 31A of the prism assembly 31 reflects the reflected laser beam by 90° to a total reflection mirror 31B. The total reflection mirror 31B reflects the laser beam, which is reflected by the PBS 31A, by 90° and allows the reflected laser beam to enter the photodetector 28 through the hologram 29B of the mold compound element 29. The photodetector 28 generates various detection signals on the basis of the amount of the received laser beam and supplies the signals to the signal processor 14 (see FIG. 1) in the optical disk apparatus 10.

(3) Arrangement of Top Emission Prism and Laser Diode

The arrangement of the components, including the top emission prism 26, in the package 27 according to this embodiment of the present invention will now be described in detail.

FIG. 3 shows the package 27 viewed from below. The top emission prism 26 is mounted on the mounting face 27A so as to cover the aperture 27C at the center of the mounting face 27A. The laser diode 25 is mounted close to one face of the top emission prism 26 (along the longitudinal axis of the package 27) on the mounting face 27A.

FIG. 4 shows the top emission prism 26 in accordance with the embodiment of the present invention. The top emission prism 26 is formed by cutting a long right-angle prism 100, whose cross section is an isosceles right triangle, such that two parallel cut lines each form a predetermined angle α (in this case, α=40°) with one edge of a first surface (upper surface in FIG. 4) of the prism 100.

The top emission prism 26, serving as a modified triangular prism, has an entrance face 26A, a first reflecting face 26B, a second reflecting face 26C, an upward reflecting face 26D which serves as a third reflecting face 26D, and an exit face 26E. The entrance face 26A is a rectangle. The first reflecting face 26B is a right triangle and is adjacent to the entrance face 26A with an edge 26ab therebetween. The second reflecting face 26C is a right triangle that is congruent to and parallel to the first reflecting face 26B and is adjacent to the entrance face 26A with an edge 26ac therebetween. The upward reflecting face 26D is a parallelogram and is adjacent to the entrance face 26A with an edge 26ad therebetween. Similarly, the upward reflecting face 26D is adjacent to the first reflecting face 26B with an edge 26bd and is also adjacent to the second reflecting face 26C with an edge 26cd therebetween. The exit face 26E is a parallelogram whose one pair of opposite angles each have an angle α=40° and is adjacent to the entrance face 26A with an edge 26ae therebetween. Similarly, the exit face 26E is adjacent to the first reflecting face 26B with an edge 26be therebetween, is adjacent to the second reflecting face 26C with an edge 26ce therebetween, and is adjacent to the upward reflecting face 26D with an edge 26de therebetween.

In the top emission prism 26, the angle (corresponding to the edge 26ab) formed by the entrance face 26A with the first reflecting face 26B is the angle α=40°. The first reflecting face 26B is parallel to the second reflecting face 26C as described above.

Each of the angle formed by the entrance face 26A with the exit face 26E, that formed by the first reflecting face 26B with the exit face 26E, and that formed by the second reflecting face 26C with the exit face 26E is a right angle (90°).

Further, each of the angle formed by the entrance face 26A with the upward reflecting face 26D and that formed by the upward reflecting face 26D with the exit face 26E is 45°.

The top emission prism 26 is mounted on the mounting face 27A of the package 27 such that the exit face 26E covers the aperture 27C. The laser diode 25 is mounted on the mounting face 27A of the package 27 such that the laser beam emitting face of the laser diode 25 is opposite the entrance face 26A of the top emission prism 26.

Accordingly, the laser diode 25 is mounted on the package 27 such that a laser beam emitted from the laser diode 25 is rotated relative to the longitudinal axis of the package 27 by a set angle β (β=90°−α=50°), i.e., the emitted laser beam forms the set angle β with the longitudinal axis of the package 27. This arrangement allows for the optimization of the shape of a laser beam spot on a track of an optical disk when the optical disk is irradiated with the laser beam focused through the objective lens 23 (see FIG. 2), the laser beam being rotated by the set angle β.

Figure 5A:
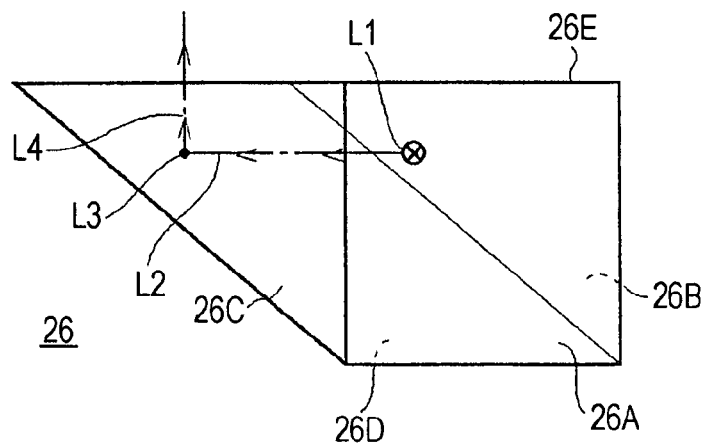
FIGS. 5A to 5C are schematic diagrams of the top emission prism.
Figure 5B:
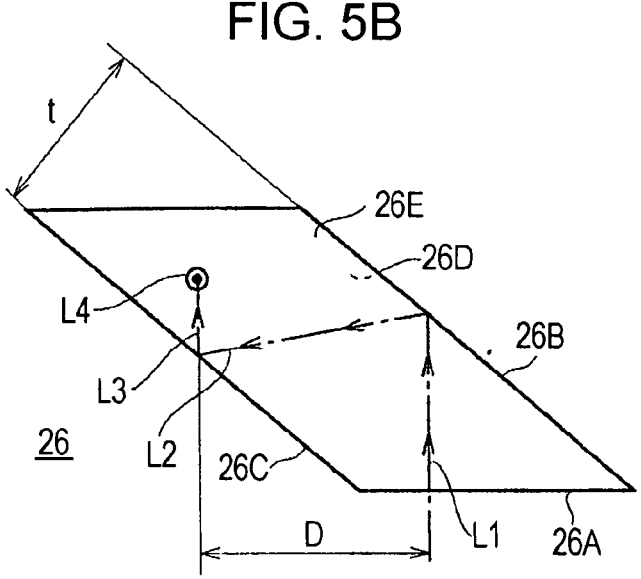
Figure 5C:
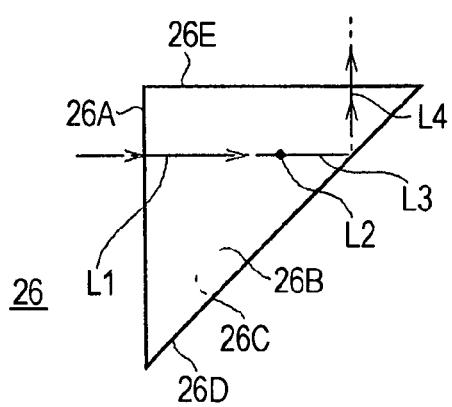
Figure 6:
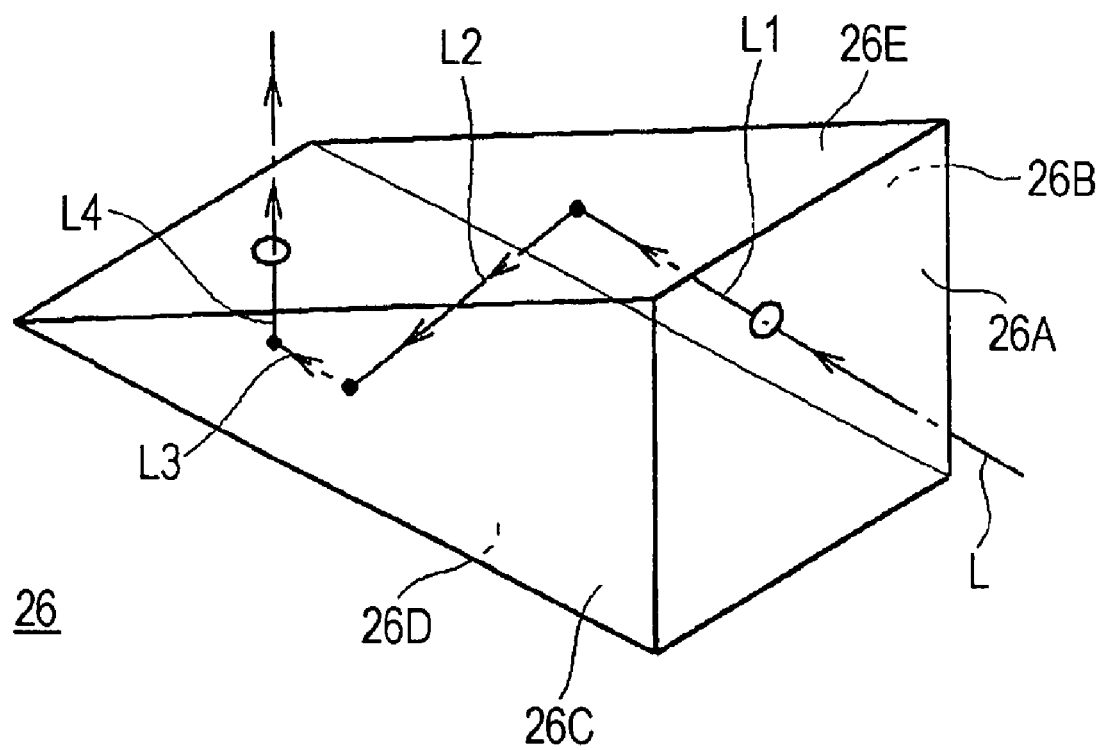
FIG. 6 is a schematic perspective view of the top emission prism, FIG. 6 schematically showing the optical path of a laser beam in the prism.

Referring to FIGS. 5A to 6, a laser beam L emitted from the laser diode 25 is perpendicularly incident on the entrance face 26A of the top emission prism 26. The entrance face 26A transmits the laser beam L in accordance with the angle of incidence of the laser beam such that the laser beam is obliquely incident on the first reflecting face 26B, as shown by an optical path segment L1.

The first reflecting face 26B of the top emission prism 26 reflects the incident laser beam L to the second reflecting face 26C such that the reflected laser beam is obliquely incident on the second reflecting face 26C, as shown by an optical path segment L2. The second reflecting face 26C reflects the incident laser beam L to the upward reflecting face 26D, as shown by an optical path segment L3.

As described above, the entrance face 26A, the first reflecting face 26B, and the second reflecting face 26C are perpendicular to the exit face 26E and the laser beam L is perpendicularly incident on the exit face 26E. Accordingly, the optical path segments L1 to L3 in the top emission prism 26 are located in a plane parallel to the exit face 26E. Since the first reflecting face 26B is parallel to the second reflecting face 26C, the optical path segments L1 and L3 are parallel to each other. When let the spacing between the first and second reflecting faces 26B and 26C be the interplanar spacing t, the distance D between the optical path segments L1 and L3 is expressed by the following expression.

$$D = t/\sin\alpha\,(0° < \alpha < 90°) \qquad (1)$$

Therefore, the top emission prism 26 shifts the laser beam L perpendicularly incident on the entrance face 26A to the second reflecting face 26C in the plane parallel to the exit face 26E by the distance D and allows the shifted laser beam to impinge on the upward reflecting face 26D.

Since the upward reflecting face 26D forms an angle of 45° with the exit face 26E as described above, the laser beam L is incident on the upward reflecting face 26D at an angle of incidence of 45°. Consequently, the upward reflecting face 26D upwardly reflects the laser beam L at a right angle such that the laser beam is perpendicularly incident on the exit face 26E, as shown by an optical path segment L4. The exit face 26E of the top emission prism 26 transmits the laser beam L according to the angle of incidence thereof without processing, so that the laser beam L emerging from the exit face 26E passes through the aperture 27C of the mounting face 27A and travels upward.

Again referring to FIG. 3, the laser diode 25 is mounted in a substantially central portion in the widthwise direction of the package 27 such that a laser beam emitted from the laser diode 25 forms the set angle β with the longitudinal axis of the package 27. Accordingly, the laser diode 25 emits a laser beam such that the laser beam travels from the substantially central portion in the widthwise direction of the package 27 to the outside. Since the top emission prism 26 is arranged so as to face the laser beam emitting face of the laser diode 25, the first reflecting face 26B and the second reflecting face 26C, each of which forms the angle α with the entrance face 26A, are parallel to each other in the lengthwise direction of the package 27.

Referring to FIG. 5B, in the top emission prism 26, the incident laser beam L is parallel-shifted by the distance D, is incident on the upward reflecting face 26D, and is reflected upward by the upward reflecting face 26D, so that the laser beam L emerges from the exit face 26E. In other words, the top emission prism 26 shifts the laser beam L, emitted from the laser diode 25 toward the outside of the package 27, to the center in the widthwise direction of the package 27 and then reflects the laser beam L upward using the upward reflecting face 26D below the aperture 27C arranged at the center of the package 27.

The optical pickup 15 uses the top emission prism 26, which shifts the laser beam L in parallel and deflects the laser beam upward as described above, according to the present embodiment of the present invention. Although the laser diode 25 is rotated in order to optimize the spot shape on the track, the laser diode 25 can be arranged in substantially the center in the widthwise direction of the package 27. Advantageously, the width of the package 27 can be remarkably reduced as compared to conventional packages.

In addition, the optical pickup 15 includes a submount 25A for holding the laser diode 25 for attachment of the laser diode 25 to the package 27, as shown in FIG. 3. The submount 25A is arranged at the center in the widthwise direction of the package 27 and the laser diode 25 is attached to the submount 25A such that the laser diode 25 is shifted in accordance with the position of the optical path of the laser beam in the top emission prism 26. Since the submount 25A whose outer dimensions are larger than those of the laser diode 25 is arranged at the center in the widthwise direction of the package 27, the width of the package 27 can be reduced to an absolute minimum.

Furthermore, since the first reflecting face 26B and the second reflecting face 26C of the top emission prism 26 are parallel to the lengthwise direction of the package 27, the width of the package 27 can be prevented from increasing, although both of the laser diode 25 and the top emission prism 26 are rotated.

(4) Operation and Advantages

In the optical pickup 15 with the above-described structure, in order to optimize the spot shape on the track, the laser diode 25 is arranged such that the laser beam emitted from the laser diode 25 is rotated relative to the longitudinal axis of the package 27 by the set angle β and the laser beam L emitted from the laser diode 25 toward the outside of the package 27 is deflected using the top emission prism 26 such that the laser beam is parallel-shifted and is then reflected upward. Although the laser diode 25 is rotated for optimization of the spot shape, the laser diode 25 can be arranged in substantially the center of the widthwise direction of the package 27. Advantageously, the width of the package 27 can be remarkably reduced as compared to the conventional packages, resulting in a reduction in width of the optical pickup 15.

Figure 10:
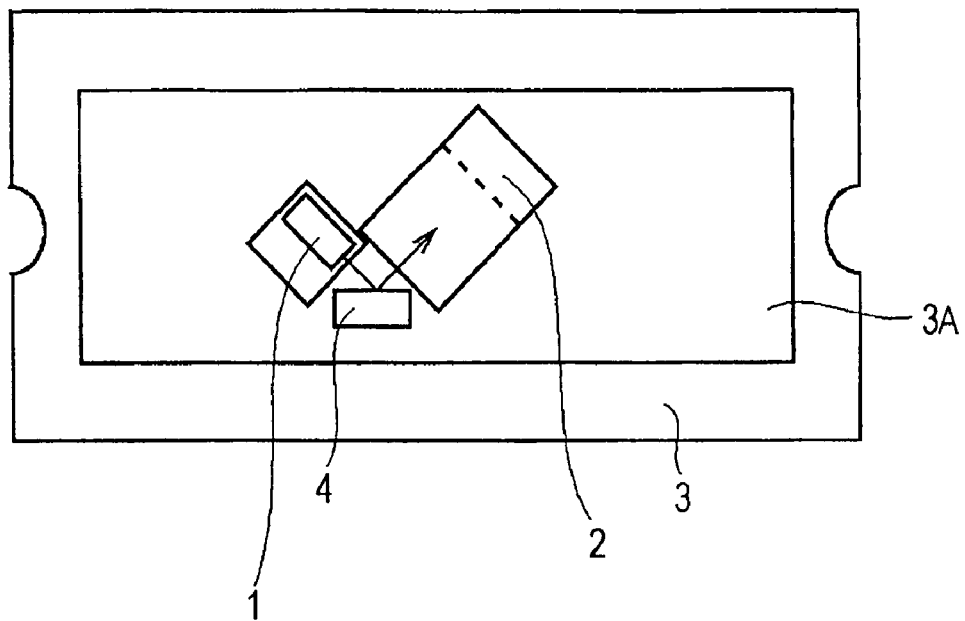
FIG. 10 is a schematic diagram of another arrangement of a laser diode and a top emission prism in a related optical pickup.
Figure 11:
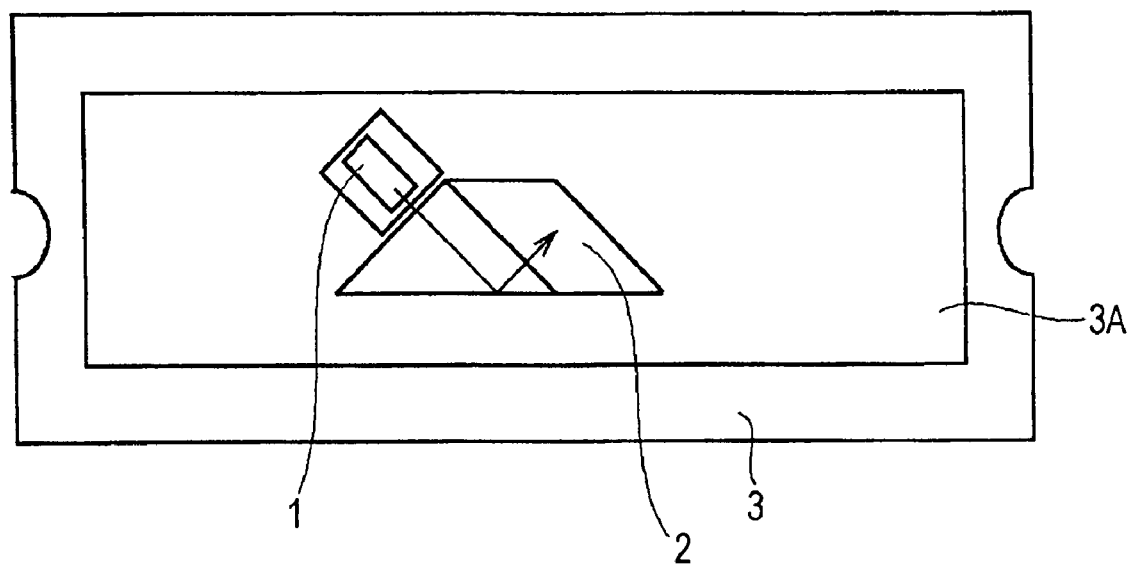
FIG. 11 is a schematic diagram of an arrangement of a laser diode and a roof prism, serving as a top emission prism, in a related optical pickup.

In addition, since the laser beam can be shifted and be deflected upward by the top emission prism 26 alone, it is unnecessary to arrange the relay mirror 4 shown in FIG. 10. Therefore, the width of the optical pickup 15 can be reduced without increasing the number of components of the optical pickup 15.

The top emission prism 26 can be manufactured by cutting a long right-angle prism such that two parallel cut lines for formation of the first and second reflecting faces 26B and 26C each form the angle α with one edge, serving as the edge 26ae, of the right-angle prism. Accordingly, the top emission prism 26 can be more simply manufactured with higher accuracy than various prisms, such as a roof prism, for this kind of applications. Advantageously, the structure of the entire optical pickup 15 can be simplified.

Further, the exit face 26E of the top emission prism 26 can be used as a reference surface for mounting on the package 27 and the entrance face 26A thereof can be used as a reference surface for arrangement of the laser diode 25. Consequently, an error in assembly of the optical pickup 15 can be suppressed.

The above-described arrangements allow for realization of a small and simple optical pickup capable of optimizing the shape of a laser beam spot on a track.

(5) Other Embodiments

In the above-described embodiment, the top emission prism 26 is formed such that the first reflecting face 26B, the second reflecting face 26C, and the upward reflecting face 26D each totally reflect a laser beam inward. The present invention is not limited to this structure. A glass member or an optical material, such as optical plastic, may be laminated on any one of the first reflecting face 26B, the second reflecting face 26C, and the upward reflecting face 26D, alternatively, glass members or optical materials, such as optical plastic, having different indices of refraction may be laminated on a plurality of reflecting faces so that each laminated face reflects a laser beam.

Figure 7A:
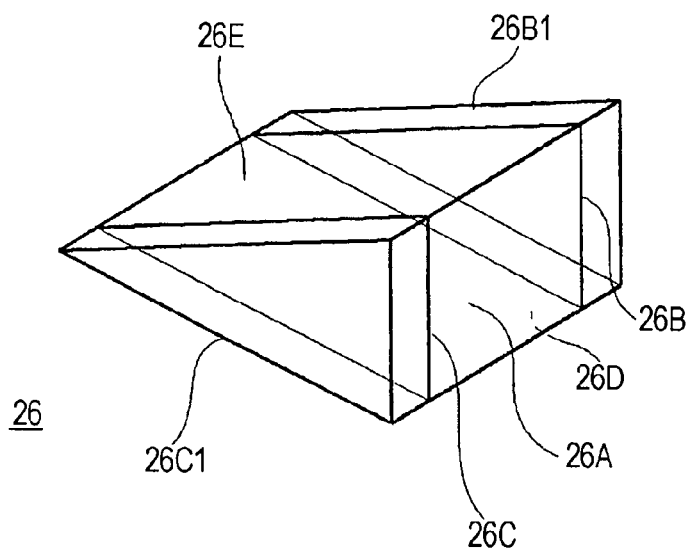
FIGS. 7A to 7C are schematic perspective views of top emission prisms according to other embodiments of the present invention.
Figure 7B:
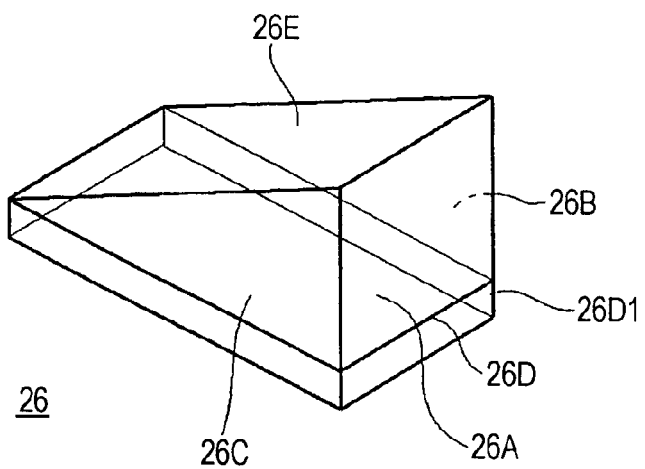
Figure 7C:
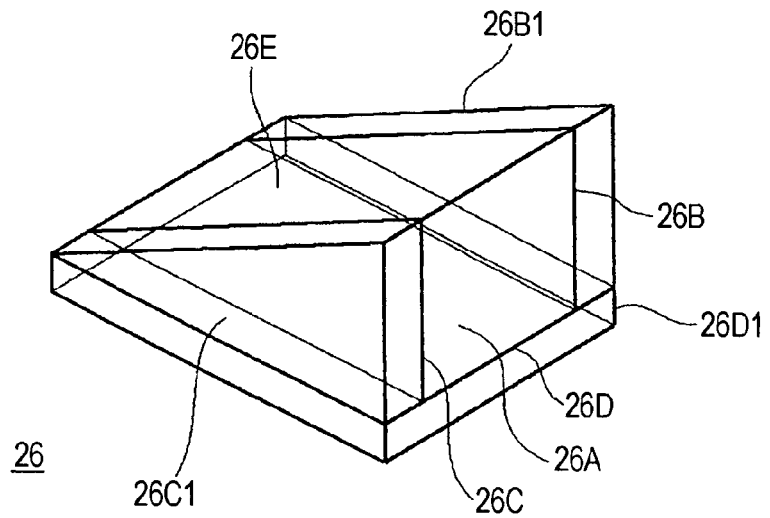

FIG. 7A shows another embodiment of the top emission prism 26 in which a first reflective glass member 26B1 is laminated on the first reflecting face 26B and a second reflective glass member 26C1 is laminated on the second reflecting face 26C. FIG. 7B shows another embodiment of the top emission prism 26 in which an upward reflective glass member 26D1 is laminated on the upward reflecting face 26D. FIG. 7C shows another embodiment of the top emission prism 26 in which the first reflective glass member 26B1, the second reflective glass member 26C1, and the upward reflective glass member 26D1 are laminated on the first reflecting face 26B, the second reflecting face 26C, and the upward reflecting face 26D, respectively.

In those cases, designing of layers on the reflecting faces can be easily made and fluctuation of laser beam reflection can be suppressed. The effect of suppressing the fluctuation of laser beam reflection is brought to the fore as the top emission prism 26 is arranged in a divergent optical path.

Figure 8:
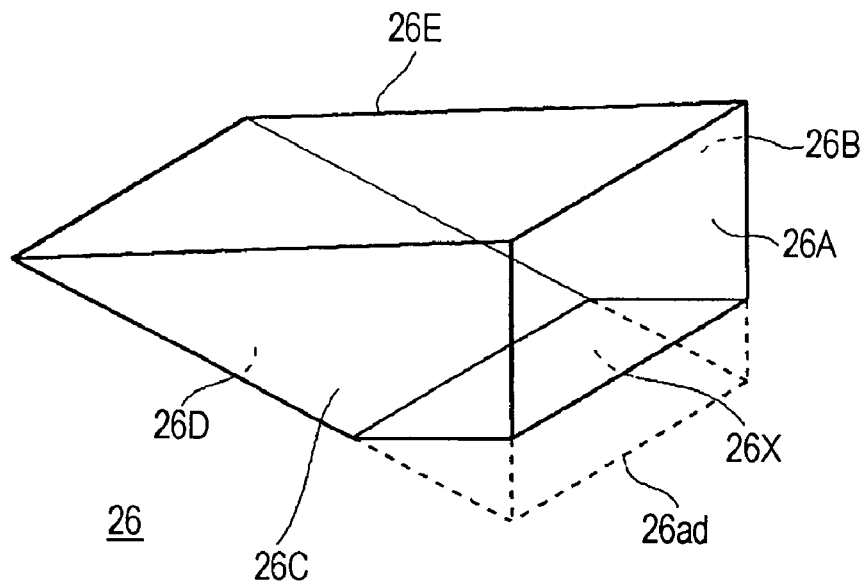
FIG. 8 is a schematic perspective view of a top emission prism according to another embodiment of the present invention.
Figure 9:
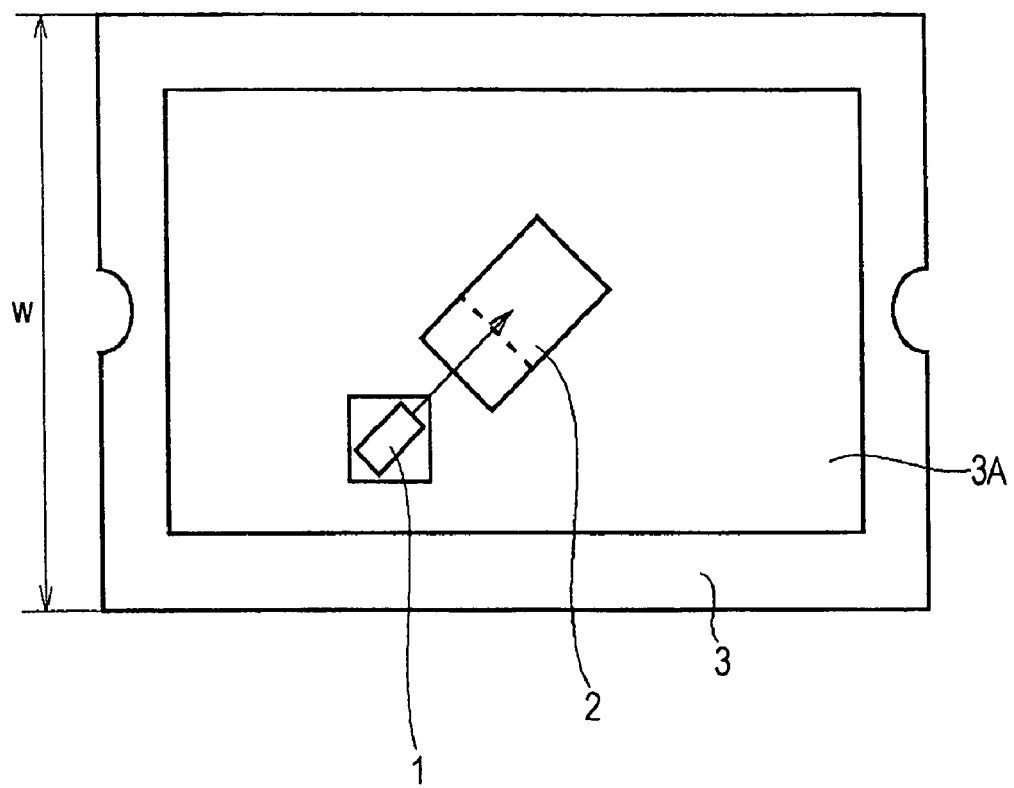
FIG. 9 is a schematic diagram of an arrangement of a laser diode and a top emission prism in a related optical pickup.

In the foregoing embodiment, the right-angle prism is cut along two lines, each of which forms the angle α (=40°) with one edge, serving as the edge 26ae, of the prism, to form the first reflecting face 26B and the second reflecting face 26C which are parallel to each other, thus forming the top emission prism 26 including rhomboidal surfaces. The present invention is not limited to this example. The top emission prism 26 may be chamfered to such extent that the chamfered part does not hinder the progress of a laser beam passing through the top emission prism 26. For example, when the edge 26ad of the top emission prism 26 is cut in parallel to the exit face 26E, a face 26X is formed as shown in FIG. 8. In this case, the height of the top emission prism 26 measured from the exit face 26E, serving as a base, is reduced, resulting in a reduction in size of the entire optical pickup 15. The top emission prism 26 may be positioned using the face 26X as an attachment surface.

In the foregoing embodiment, the right-angle prism is cut along two lines, each of which forms the angle α (=40°) with one edge, serving as the edge 26ae, of the prism such that the first reflecting face 26B forms an angle of 40° with the entrance face 26A and the second reflecting face 26C forms an angle of 40° with an extension of the entrance face 26A. The present invention is not limited to this example. The angle α may be determined in accordance with the set angle of rotation of the laser diode 25, the set angle being determined on the basis of the angle of rotation of a laser beam spot on a track.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup, comprising:
  a light emitting device; and
  a prism comprising:
    a first face configured to receive a laser beam from the light emitting device, the laser beam having an optical axis oriented perpendicularly to the first face; and
    a plurality of reflective faces configured to generate within the prism a reflected laser beam having an optical axis that is offset from and parallel to the optical axis of the laser beam received by the first face wherein the plurality of reflective faces of the prism is further configured to generate within the prism, from the reflected laser beam, a laser beam having an optical axis oriented perpendicularly to the optical axis of the laser beam received by the first face.

2. The optical pickup of the claim 1, wherein the plurality of reflective faces comprises three reflective faces.

3. The optical pickup of claim 1, wherein the plurality of reflective faces consists of three reflective faces.

4. The optical pickup of claim 1, further comprising an objective lens configured to receive and collimate an output laser beam of the prism.

5. A method, comprising:

receiving, at a first face of a prism, an incident laser beam having an optical axis oriented perpendicularly to the first face of the prism;

reflecting the incident laser beam at least twice within the prism to generate within the prism a reflected laser beam having an optical axis offset from and parallel to the optical axis of the incident laser beam; and providing to an objective lens a transmitted laser beam from the prism having an optical axis oriented perpendicularly to the optical axis of the incident laser beam.

6. The method of claim 5, further comprising collimating the transmitted laser beam using the objective lens to form a collimated laser beam.

7. The method of claim 6, further comprising providing the collimated laser beam to an optical disk.

8. The method of claim 5, wherein providing the transmitted laser beam comprises reflecting the reflected laser beam within the prism to generate the transmitted laser beam.

* * * * *